United States Defensive Publication [19] (H) [11] T104,801

Rozycki [43] Nov. 6, 1984

[54] VIBRATOR MASS ACTUATOR DESIGN

[76] Inventor: Marek L. Rozycki, 10210 Forum West, Houston, Tex. 77036

[21] Appl. No.: 403,888

[22] Filed: Jul. 30, 1982

[51] Int. Cl.[3] ..... G01V 1/135

[52] U.S. Cl. ..... 181/119

[57] ABSTRACT

A linear actuator 10 for use as a seismic vibrator includes a reaction mass 12 having an internal cylinder 14, and containing a double acting piston 20 to which are attached upper and lower pistons 26 and 28. Hydraulic fluid under pressure is applied alternately to the upper and lower faces of piston 20 to reciprocate it in alternate strokes relative to the reaction mass. Rolling diphragm seals 38 and 40, secured between piston shafts 26, 28 and reaction mass 12, prevent external contamination from reaching laminar seals 30 and 32. Shafts 26 and 28 include enlarged portions 44 and 46 that are contactable with nests of conical springs 52 and 54, mounted at the top and bottom of reaction mass 12, at the displacement limits of piston shafts. Said conical springs absorb energy and limit rebound between the reaction mass and the piston shaft.

1 Claim, 1 Sheet Drawing,

11 Pages Specification

The file of this unexamined application may be inspected and copies thereof may be purchased (849 O.G. 1221, Apr. 9, 1968).

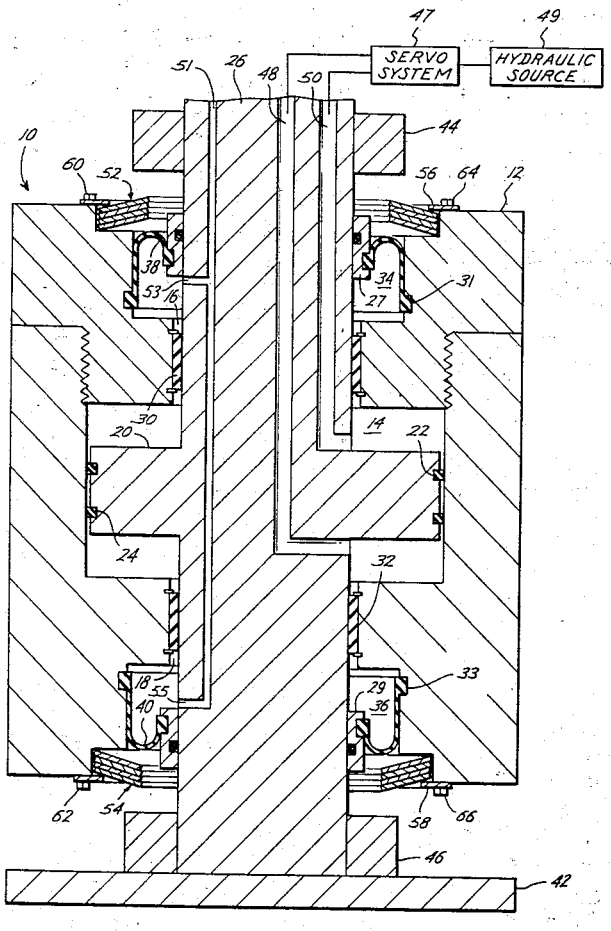

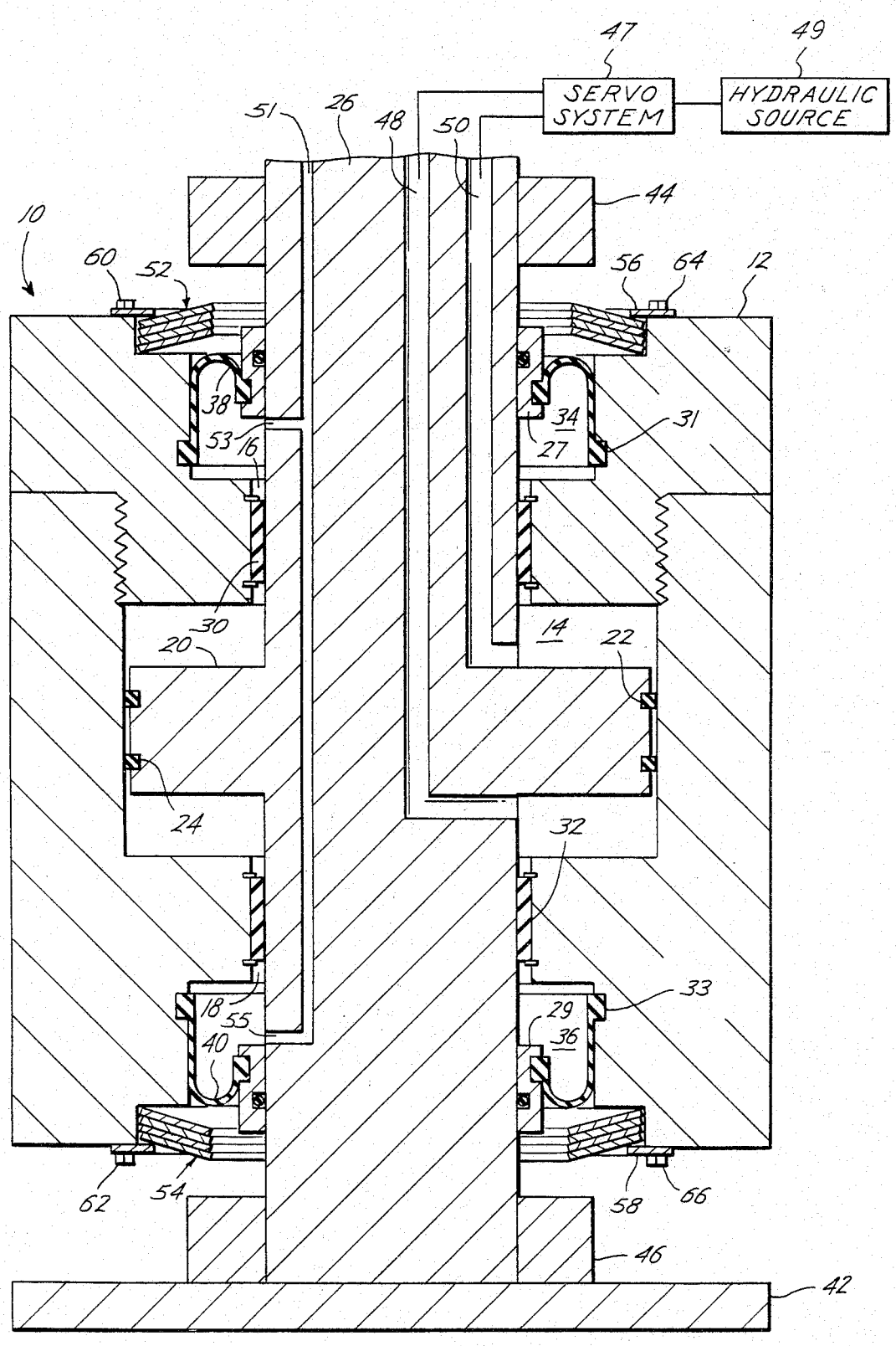
47
49
SERVO SYSTEM
HYDRAULIC SOURCE
51
26
48
50
44
10
60
52
56
64
12
38
34
31
53
16
27
30
14
20
22
24
32
33
18
55
29
40
36
62
54
58
66
46
42